(12) United States Patent
Zou et al.

(10) Patent No.: US 11,547,967 B1
(45) Date of Patent: *Jan. 10, 2023

(54) HYDROGEN SULFIDE REMOVAL PROCESS

(71) Applicant: MERICHEM COMPANY, Houston, TX (US)

(72) Inventors: Baisheng Zou, Pearland, TX (US); Jeffrey B. Gomach, League City, TX (US); David Jackson, Fort Bend, TX (US)

(73) Assignee: MERICHEM COMPANY, Houston, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/351,093

(22) Filed: Jun. 17, 2021

(51) Int. Cl.
*B01D 53/00* (2006.01)
*B01D 53/14* (2006.01)
*B01D 53/18* (2006.01)

(52) U.S. Cl.
CPC ..... *B01D 53/1468* (2013.01); *B01D 53/1425* (2013.01); *B01D 53/1493* (2013.01); *B01D 53/185* (2013.01); *B01D 2252/20478* (2013.01); *B01D 2252/602* (2013.01); *B01D 2255/20738* (2013.01); *B01D 2256/245* (2013.01); *B01D 2257/304* (2013.01)

(58) Field of Classification Search
CPC .......... B01D 2251/102; B01D 2251/90; B01D 2258/02; B01D 47/06; B01D 47/10; B01D 53/52; B01D 53/8612; B01D 53/48
See application file for complete search history.

(56) References Cited

U.S. PATENT DOCUMENTS

| | | | |
|---|---|---|---|
| 3,803,805 A | 4/1974 | Low | |
| 4,622,212 A | 11/1986 | McManus et al. | |
| 5,658,541 A * | 8/1997 | Matros | B01D 53/8603 423/230 |
| 8,372,365 B2 * | 2/2013 | Nagl | B01D 53/8612 423/220 |

* cited by examiner

*Primary Examiner* — Sharon Pregler
(74) *Attorney, Agent, or Firm* — McDonnell Boehnen Hulbert & Berghoff LLP

(57) ABSTRACT

A process is presented to treat a process gas stream containing hydrogen sulfide using a reverse jet absorber with a liquid treatment solution containing a chelated metal catalyst. A treat gas substantially free of the hydrogen sulfide is separated from a spent liquid treatment solution containing elemental sulfur which can then be regenerated in an oxidation vessel where it is contacted with an oxygen containing gas to convert the spent liquid treatment solution to a regenerated liquid treatment solution that can be recycled for introduction into the reverse jet absorber.

13 Claims, 1 Drawing Sheet

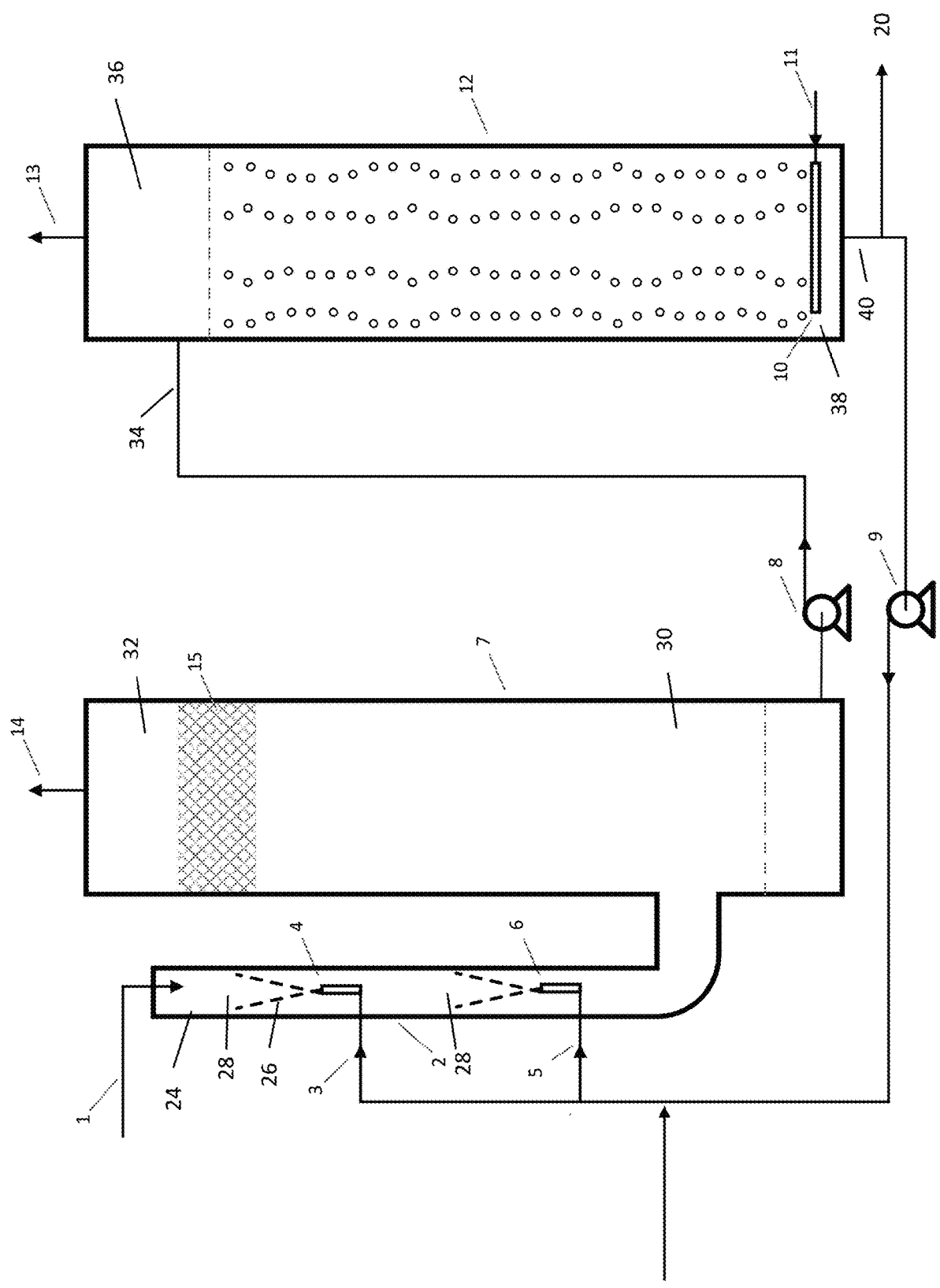

HYDROGEN SULFIDE REMOVAL PROCESS

TECHNICAL FIELD

The present disclosure is directed to a method and apparatus for continuously removing hydrogen sulfide gas ($H_2S$) from a gas stream or a so-called sour gas. Such gas streams include traditional process gas streams, as well as, waste gas effluents. The method involves a reduction-oxidization process where the $H_2S$ in the gas stream is contacted with a catalytic aqueous treatment solution in a reverse jet absorber column to cause the sulfide in the $H_2S$ to be converted to solid sulfur. The spent catalyst in the aqueous treatment solution can be regenerated in an oxidizer using an oxygen-containing gas and then recycled for use as part or all of the aqueous treatment solution.

BACKGROUND

Hydrogen sulfide is a major source of pollution of gas streams since it is liberated as a waste by-product in a number of chemical processes, such as sulfate or kraft paper pulp manufacture, viscose manufacture, sewage treatment, the production of organic sulfur compounds, as well as during petroleum refining and in the production of natural gas and combustible gases from coal, such as in coking operations. Hydrogen sulfide is also present in geothermal steam, which is captured for use in power generating plants.

To eliminate these polluting sulfur gases the art has developed several reduction-oxidation ("Redox") processes that use an aqueous liquid chelated metal catalyst solution for removing hydrogen sulfide from a gas stream. In those prior art processes, a hydrogen sulfide-containing gas, known as "sour gas," is contacted with a chelated metal catalyst to effect absorption. Subsequent oxidation of the hydrogen sulfide to elemental sulfur and concurrent reduction of the metal to a lower oxidation state also occurs. The catalyst solution is then regenerated for reuse by contacting it with an oxygen-containing gas to oxidize the metal back to a higher oxidation state. The elemental sulfur is continuously removed from the process as a solid product with high purity. Illustrative, but not exclusive, of these oxidation-reduction processes is the description contained in U.S. Pat. Nos. 4,622,212; 8,372,365 and the references cited therein.

Known sulfur removal processes use bubble column type of absorbers for $H_2S$ absorption where the sour gas is sparged or bubbled into the liquid catalytic treatment solution. Such absorber designs are chosen because bubble columns are less prone to sulfur plugging. However, the disadvantages of bubble column absorber are low gas velocity, high gas pressure drop, and low mass transfer coefficient, resulting in absorber designs that are very large in size. Other types of absorber designs include counter-current flow packed beds and co-current flow static mixers that achieve higher gas velocities (200 ft/min-1000 ft/min). Absorbers using packed bed are prone to flooding at high velocity because of the counter-current gas-liquid flow. Static mixer absorber designs are chosen when a high pressure operations is needed since a bubble column absorber would become prohibitively expensive due to the needed size and vessel wall thickness. Additionally, both the packed bed absorber and the static mixer absorber are also known to suffer elemental sulfur plugging.

Accordingly, there is a need in the technical area of $H_2S$ removal for an absorber design that allows large gas flow and gas velocity, with small pressure drop across the absorber, and yet will not be plugged by product sulfur after a prolonged operation. The present disclosure provides a reverse jet absorber design and a process of operating an $H_2S$ removal process that uses such an absorber, which design avoids the above-noted issues with conventional $H_2S$ removal processes. These and other advantages will become evident from the following more detailed description of the present disclosure.

SUMMARY

This disclosure relates to a process for treating a stream containing hydrogen sulfide ($H_2S$), where the gas to be treated include traditional process gas streams, e.g. a methane or other hydrocarbon containing gas. Likewise, sour waste gas effluents can be treated. Specifically, an improved reduction-oxidization process is disclosed that converts hydrogen sulfide in a sour gas stream to solid elemental sulfur. The improved process uses a reverse jet absorber design. Reverse jet absorbers have found utility in processes where particulate removal from gas streams is desired. For example, see U.S. Pat. No. 3,803,805. Such known absorbers require operation with gas flows through the absorber of at least 1,000 feet/minute and at no less than the flooding velocity. Stated differently, these known processes require that the flooding velocity be equaled or exceeded.

One possible embodiment of the present disclosure is a continuous process of removing hydrogen sulfide from a sour gas stream where the gas stream is introduced into the top section of an absorber column with sufficient velocity to cause the gas stream to flow downward in the column. Simultaneously with the gas stream introduction is the introduction of a liquid treatment solution into one or more jet nozzles that are positioned within the absorber column below the inlet opening of the gas stream. The jet nozzles are positioned centrally within the absorber column such the liquid treatment is directed upward through the nozzle such that a high velocity jet of liquid is injected into the downward flowing gas stream. The countercurrent contact between the upwardly flowing liquid treatment solution and the downward flowing gas stream creates a turbulent mixing zone where the $H_2S$ in the gas stream is absorbed into the liquid treatment solution to form an admixture.

The flow rate of the gas stream and the liquid treatment solution is selected such that the liquid treatment solution is not allowed to flow upward to the top section of the absorber where the gas stream is introduced into the absorber column. The admixture of liquid treatment solution with the absorbed sulfides and the remaining gas continues to move further down the absorber column and discharges into a bottom section of a separator that is directly connected to the absorber column. The catalyst components in the liquid treatment solution catalytically oxidize the absorbed sulfides to elemental sulfur forming a spent liquid treatment solution that contains suspended particles of the elemental sulfur. Simultaneously with the formation of the elemental sulfur, a portion of the catalyst contained in the liquid treatment solution is reduced to a noncatalytic state.

The catalytic components contained in the liquid treatment solution of the present disclosure can include a number of polyvalent metals, with a preferred polyvalent metal being iron. Preparation of the catalyst component of the liquid treatment solution is preferably accomplished using an iron chelating agent that forms a complex in aqueous solutions with iron in the ferric valence state ($Fe^{3+}$) or in the ferrous valence state ($Fe^{2+}$). Among the iron chelate reagents which can be used for removing hydrogen sulfide are the aminopolycarboxylic acid-type chelating agents, such as ethylenediamine tetraacetic acid and the alkali metal salts thereof.

The series of reactions involved in catalytically oxidizing hydrogen sulfide to elemental sulfur using an iron chelate catalyst can be represented by the following reactions, where L represents the particular ligand chosen to formulate the metal chelate catalyst:

$$H_2S_{(gas)} + H_2O_{(liq.)} \rightarrow H_2S_{(aqueous)} + H_2O_{(liq.)} \quad (1)$$

$$H_2S_{(aqueous)} \rightarrow H^+ + HS^- \quad (2)$$

$$HS^- + 2(Fe^{3+}L_2) \rightarrow S_{(solid)} + 2(Fe^{2+}L_2)H^+ \quad (3)$$

By combining equations (1) through (3) the resulting equation is:

$$H_2S_{(gas)} + 2(Fe^{3+}L_2) \rightarrow 2H^+ + 2(Fe^{2+}L_2) + S_{(solid)} \quad (4)$$

After absorption of the hydrosulfide into the liquid treatment solution, a treated gas, i.e., "sweet gas", results and is then separated from the spent liquid treatment solution within the separator. The separated sweet gas is cleaned by passing the gas upwards through a mist eliminator to remove any entrained solids or liquids. The cleaned sweet gas is removed from the separator and can be sent for further processing, transportation, combustion or for direct use in other chemical processes or directly vented to the atmosphere, e.g. when the disclosed process is employed in an amine regenerator or sour water stripper.

The spent liquid treatment solution is removed from a bottom section of the separator, for example by a pump, and subsequently introduced into a top section of separate oxidation vessel where it is contacted with an oxygen containing gas, e.g., air. Preferably this contacting occurs via a sparging system located in a bottom section of the oxidation vessel where pressurized air is introduced through a plurality of spargers such that very tiny bubbles of oxygen, having high surface area, flow upward through the spent liquid treatment solution. This causes the polyvalent metal to regenerate back (oxidize) to the original active catalyst state, thus regenerating the spent liquid treatment solution.

To achieve an economical workable process for removing hydrogen sulfide from a gaseous stream when a ferric iron chelate is used to effect catalytic oxidation of the hydrogen sulfide, it is preferred that the ferrous iron chelate formed in the above-described manner be continuously regenerated by oxidizing to ferric iron chelate on contacting the reaction solution with dissolved oxygen, preferably obtained from introduction of pressurized ambient air into the oxidation vessel. The series of reactions which take place in the oxidizer when regenerating the spent liquid treatment solution containing the metal chelate catalyst can be represented by the following equations:

$$O_{2\,(gas)} + 2H_2O \rightarrow O_{2\,(aqueous)} + 2H_2O \quad (5)$$

$$O_{2\,(aqueous)} + 2H_2O + 4(Fe^{2+}L_2) \rightarrow 4(OH^-) + 4(Fe^{3+}L_2) \quad (6)$$

By combining equations (5) through (6), the resulting equation (7) is:

$$\tfrac{1}{2}O_2 + H_2O + 2(Fe^{2+}L_2) \rightarrow 2(OH^-) + 2(Fe^{3+}L_2) \quad (7)$$

And, when equations (4) and (7) are combined, the overall process can be represented by the following equation:

$$H_2S_{(gas)} + \tfrac{1}{2}O_{2\,(gas)} \rightarrow S_{(solid)} + H_2O_{(liq.)} \quad (8)$$

Excess oxygen containing gas is removed from the top section of the oxidation vessel and a liquid stream of regenerated liquid treatment solution having suspended elemental sulfur particles is removed from the bottom section of the oxidation vessel. Preferably, the regenerated liquid treatment solution is recycled and introduced into the nozzle or nozzles within the absorber column. To compensate for a loss or depletion of the total amount of the catalyst in the liquid treatment solution, fresh or make-up liquid treatment solution or catalyst components can be added as required by mixing directly with the recycled regenerated liquid treatment solution. The make-up catalyst stream preferably comes from a storage tank and comprises fresh liquid treatment solution containing fresh catalyst components.

A bleed, purge or slip stream of the regenerated liquid treatment solution can be removed from the process to prevent build-up of the elemental sulfur within the process. This removed slip stream can be introduced into a sulfur recovery device, where the sulfur is removed from the process that physically separates the suspended solid elemental sulfur particles. Typically, vacuum belt filters are used to remove sulfur from process solution in industrial scale. Bag filters and Fundabac candle filters have been used as well.

As mentioned, the liquid treatment solution contains a catalyst that can contain anions of alkali or ammonia salts and cations of hydroxide, sulfide or carbonate, such as, potassium carbonate, potassium hydroxide, calcium carbonate, sodium hydroxide, sodium carbonate, ammonia, and potash. Additionally, solutions of ammonia or alkali metal salts of weak acids such as carbonic, boric, phosphoric and carbolic acids, or aqueous solutions or organic bases such as ethanol-amines can be used, as well as, aqueous solutions of alkali metal salts of amino-carboxylic acids.

The salt concentration in the liquid treatment solution is preferably between 0 wt. % and a quantity that is sufficient to saturate the solution. The amount of treatment solution used is based on the concentration of $H_2S$ in the gas stream that is introduced into the absorber column, as well as the feed rate of the gas stream. The concentration can be determined through sampling and subsequent lab analysis. Sulfide ions are formed upon E125 absorption in the liquid treatment solution which are then adsorbed on the catalyst components for the further reaction.

The operating parameters of the above-described absorber/separator/oxidation processes include temperatures in the range of from about 15° C. to about 90° C., preferably in the range from about 40-70° C. The pressure of the vessels can range from atmosphere to 150 barg, preferably from about 0.5-30 barg. Reaction times can range from about 5-240 mins, preferably less than 30 min. The process can be run as a batch or continuous operation.

These and other objects will become more apparent from the detailed description of the preferred embodiment contained below.

BRIEF DESCRIPTION OF THE FIGURES

In the following detailed description of the present disclosure, reference will be made to the accompanying drawings, of which, FIG. 1 schematically illustrates one possible embodiment of the present disclosure.

DETAILED DESCRIPTION

FIG. 1 presents one possible process flow scheme of the present disclosure that can be used to desulfurize a gas stream contaminated with $H_2S$. Although the disclosed process unit operations are shown in the figures and described below with a vertical orientation having a "top" and a "bottom", the actual design of the process equipment may have spatial orientations that are more "horizontal" than "vertical" and therefore gas and liquid flows maybe directed into and out of the equipment from the sides as opposed to top and bottoms.

A process gas stream (i.e., a sour gas) is delivered via feed line 1 to a top section 24 of an absorber column 2 which is in direct fluid communication with separator 7. The gas stream flows downward within the absorber column where it eventually contacts a jet of liquid treatment solution 26 being discharged from a jet nozzle 4. Liquid treatment solution containing the metal chelated catalyst is delivered through line 3 and forced through jet nozzle 4 to create an upward directed spray of liquid treatment solution. In some cases, it may be desirable to include additional jet nozzles for introducing the liquid treatment solution into the absorber column. FIG. 1 illustrates a flow scheme where a second jet nozzle 6 being fed by line 5 is physically located below the first jet nozzle 4. Positioning of the jet nozzles within the absorber column 2 is preferably along the center longitudinal axis of the absorber column. Although several nozzle designs can be used, experimental data suggests that a full cone nozzle performs better than a hollow cone nozzle.

The flow rate of the liquid treatment solution is selected such that a turbulent zone 28 is formed above the nozzle discharge creating intense mixing and contact between the downwardly flowing gas stream and the upward jet of liquid treatment solution. A preferred flow rate for the liquid treat solution through the jet nozzle is in the range from about 20 gpm/ft$^2$ to about 400 gpm/ft$^2$. The intense mixing of the liquid and the gas causes the $H_2S$ present in the gas stream to be absorbed into the liquid treatment solution within the turbulent zone.

The flow rate of the liquid treatment solution through the nozzle(s) and the flow rate of the sour gas stream is selected to avoid the flooding velocity, which is the well-known phenomenon which occurs when a gas velocity is sufficient to hold up liquid in an open pipe. Unlike other known reverse jet processes, the present process is preferably operated well below the flooding velocity, and most preferably 25% of flooding velocity. A preferred flow rate for the gas stream entering the absorber column is in the range from about 200 ft/min to about 500 ft/min. The flow rate of the gas stream moving down the absorber column is selected to reverse the upward flow of the liquid treatment solution out of the nozzle such an admixture comprising gas, liquid and absorbed sulfide flows down the column 2 and is discharge into a bottom section 30 of separator 7.

The admixture entering the bottom of separator 7 contains a spent liquid treatment solution where the catalyst has been reduced during the conversion of the sulfide to elemental sulfur which takes the form of particles that are suspended in the spent liquid treatment solution. The admixture also contains treated gas (sweet gas) where the $H_2S$ has been substantially removed, preferably to a level of 99% or higher. The admixture is allowed to gravity settle and separate such the treated gas separates from the liquid phase and flows upward inside the separator. The treated gas is passed through mist eliminator 15 located in an upper section 32 of the separator to remove any entrained liquid or solid particles from the treated gas. The cleaned and treated gas exiting the mist eliminator is then removed from the upper section 32 through line 14 for further processing, refining, combustion or transportation.

Pump 8 can be used to continuously remove the separated liquid phase from the bottom section 30 of the separator 7 and to introduce the spent liquid treatment solution through line 34 into an upper section 36 of oxidation vessel 12. The spent liquid treatment solution entering the oxidizer 12 from line 34 containing spent catalyst and elemental sulfur is directed downward within the oxidizer vessel through the action of pump 9 that removes a regenerated liquid treatment solution 40 from the bottom section 38 of oxidizer 12. An oxygen-containing gas 11, such as air, is introduced into the oxidizer 12, preferably through a sparger 10 positioned in the bottom section 38. The amount of oxygen added to the oxidizer is controlled by monitoring oxidation reduction potential (ORP) values. For example, one method would include using a sensor located in the absorber and/or in the oxidizer to measure the ORP values of the solution(s). The measured ORP could be monitored by control valve which then adjusts the amount of oxygen containing gas supplied to the oxidizer 12 through line 11. Alternatively, the ORP value of the regenerated liquid treatment solution exiting the oxidizer in line 40 could be measured, monitored and used to control the flow or amount of oxygen containing gas that is introduced into the oxidizer. Likewise, or in addition to, another method could include using the measured ORP values obtained from sensors in line 40 and/or in the oxidizer to operate a control valve which then adjusts the amount of liquid treatment solution that is injected via lines 3 and/or 5 into the absorber column 2 through jets 4 and/or 6.

Alternatively, or in addition to, the concentration of $H_2S$ in the treated or sweet gas stream 14 can be monitored and measured to control the amount of oxygen that is added to the oxidizer. Excess oxygen-containing gas is removed from the top of the oxidizer 12 through line 13. The regenerated liquid treatment solution containing elemental solid sulfur particles is removed via line 40 from the oxidizer 12 and can be recycled for use as part of, or all of, the liquid treatment solution introduced into the absorber column 2. In some circumstances it may be beneficial to introduce fresh or make-up treatment solution via line 22 into the stream of recycled regenerated liquid treatment solution. To prevent a build-up of elemental sulfur in the process, a portion of regenerated liquid treatment solution can be removed from line 40 via stream 20 for further processing to recover the solid elemental sulfur possibly as a useful byproduct. Such a recovery process can remove about 90-98 wt. % of the sulfur found in line 40. Thus, this slip stream 20 can maintain a substantially sulfur free recycled regenerated liquid treatment solution having a target sulfur level of less than about 0.1 wt. %.

A series of experimental pilot runs were conducted using a process flow scheme similar that depicted in FIG. 1. $H_2S$ removal efficiency and absorber pressure drop as a function of operating variables such as gas and liquid velocities were measured and obtained. Table 1 below shows test results where $H_2S$ absorption was tested at three different pressures of 16.7 psia, 46.6 psia and 93.0 psia. To maintain the same actual gas velocity, gas volumetric flow rate was increased from 5.1 scfm to 15.5 scfm, and then to 30.2 scfm. The absorber column inner diameter was 2 in. and the spraying nozzle orifice diameter was 0.125 in. $H_2S$ ppm of the gas stream was varied from 600 ppm to 1793 ppm. $H_2S$ removal efficiencies of 99.0%, 96.9% and 95.6% were obtained for three tests, respectively.

TABLE 1

Experimental Results of $H_2S$ Removal with a Reverse Jet Absorber

| Description | Units | Test #1 | Test #2 | Test #3 |
|---|---|---|---|---|
| Inlet Gas Flow | scfm | 5.1 | 15.5 | 30.2 |
| Inlet $H_2S$ ppm | ppm | 1793 | 1200 | 600 |
| Absorber Diameter | in | 2 | 2 | 2 |
| Spraying Nozzle Orifice | in | 0.125 | 0.125 | 0.125 |
| Solution Temperature | °F | 107 | 109 | 113 |
| Solution pH | | 7.95 | 8.27 | 8.19 |
| Inlet Pressure | psia | 16.7 | 46.6 | 93.0 |
| Gas Velocity | ft/min | 247 | 252 | 246 |
| Liquid GPM | gpm | 6.0 | 5.8 | 6.1 |
| Exit $H_2S$ ppm | ppm | 18 | 38 | 26 |
| % Removal | | 99.0% | 96.9% | 95.6% |

TABLE 2

Reverse Jet H2S Removal Efficiency as a Function of Gas Velocity

| Gas Velocity (ft/min) | 191 | 301 | 400 | 596 | 1272 |
|---|---|---|---|---|---|
| Oxidizer pH | 8.53 | 8.71 | 8.67 | 8.70 | 8.16 |
| H2S Inlet Conc., % | 0.69 | 0.43 | 0.33 | 0.22 | 5.00E−05 |
| Liquid Flow 2 Nozzles, gpm | 4.76 | 4.63 | 4.52 | 4.60 | 5.00 |
| H2S Outlet Conc., ppm | 1.3 | 7.8 | 28.2 | 100* | 12.4 |
| H2S Removal % | 99.98% | 99.80% | 99.03% | 97.25% | 75.20% |
| Pressure Drop, inW | 5.6 | 4.9 | 6.9 | 7.1 | 15.4 |
| Residence Time, s | 2.5 | 1.6 | 1.2 | 0.8 | 0.37 |

*out of analyzer range

The use of reverse jet technology for $H_2S$ removal from a sour gas stream has not previously been used or known to the art of gas sweetening. There are uncertainties of mass transfer from gas phase to liquid phase and reaction kinetics in liquid phase. Previous uses of reverse jet processes cannot be automatically assumed for $H_2S$ for two reasons. The first reason relates to logarithmic acid dissociation constant pKa of $H_2S$, which is has a pKa of 7 in $H_2O$. This high pKa means that $H_2S$ is more difficult to absorb into an aqueous solution than other sulfur containing compounds such as $SO_2$. An optimal aqueous solution of pH 7 and above is needed for $H_2S$ absorption, whereas pH of above 2 is used for $SO_2$ absorption. The other reason why jet nozzles would not be assumed applicable to a hydrosulfide removal process is that the sulfide adsorption and catalytic conversion to elemental sulfur is limited by reaction kinetics in the liquid phase.

Another uncertainty for the use of reverse jet technology was whether reverse jet spraying nozzle could handle produced elemental sulfur. Sulfur produced from the chelated iron liquid treatment solution process is very sticky in that it tends to stick to the surfaces that it encounters. There was uncertainty whether this sticky sulfur would accumulate on the fluid passages of the spraying nozzle resulting in the nozzles becoming inoperative or greatly increasing the spraying nozzle pressure drop. After a prolonged operation of the pilot process described above, no plugging of the spraying nozzle was noticed, even though the nozzle orifice was only 0.125 in. in diameter.

Further analysis of the testing results using the pilot process showed that lower gas velocity (<300 ft/min) was favored for $H_2S$ absorption. This is directly opposite the expected results based on prior reverse jet processes where the preferred operating conditions for $SO_2$ absorption is at or above the flooding points, namely high gas velocities of 1,000-2,000 ft/min. As indicated in Table 1, the pilot process was using inlet $H_2S$ ppm that are 10 times higher than the $SO_2$ ppm absorption processes. Table 2 shows that as gas velocity increased, $H_2S$ removal efficiency decreased. The reason that $H_2S$ absorption favors low velocity instead of high velocity is that $H_2S$ reaction kinetics favors longer residence time, which is tabulated in the last row of Table 2.

The process of the present disclosure thus far has been described with particular emphasis on the use of iron as the polyvalent metal of choice; however, other polyvalent metals that form chelates with the ligands described above can also be used. Such additional polyvalent metals include copper, cobalt, vanadium, manganese, platinum, tungsten, nickel, mercury, tin and lead. The chelating agents are generally of the aminopolycarboxylic acid family such as EDTA, HEDTA, MGDA and NTA, or others any one of which can be used in connection with this invention.

In all liquid oxidation-reduction systems, some form of alkaline material should be added to the system to control the pH of the solution. Without the addition of the alkaline material, the pH of the solution will slowly decrease until absorption of $H_2S$ into the solution is no longer great enough to meet the required $H_2S$ removal efficiencies. This decrease in pH is due to the acidic nature of $H_2S$. In addition, if the gas stream being processed contains other acidic species such as carbon dioxide, the pH will decrease even more quickly than with just $H_2S$. Consequently, alkaline materials such as NaOH, KOH, ammonia, alkali metal carbonates, or bicarbonates are generally added to the system to neutralize the acidic components. These materials are generally added to the bulk solution contained in the oxidizer; however, they can be added anywhere in the process.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

The means, materials, and steps for carrying out various disclosed functions may take a variety of alternative forms without departing from the invention. Thus, the expressions "means to . . . " and "means for . . . ", or any method step language as may be found in the specification above or the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

The invention claimed is:

1. A process to treat hydrogen sulfide present in a gas stream comprising:
   directing the gas stream containing hydrogen sulfide into an absorber and separator combination comprising two vertical parallel columns, where the first column is in fluid communication with the second column such that a bottom of the first column is connected to a bottom portion of the second column and where the gas stream is introduced into a top portion of the first column in a first direction such that it moves down the first column;

injecting a first stream of liquid treatment solution comprising a chelated metal catalyst into the gas stream through a jet nozzle positioned within the first column at a position where the first jet nozzle is oriented to cause the liquid treatment solution to flow in a second direction upward and into the gas stream to create a first turbulent mixing zone adjacent to the first jet nozzle;

maintaining the flow rate of the gas stream within the first column such that the flow of the liquid treatment solution is reversed to flow in the first direction;

absorbing the hydrogen sulfide into the liquid treatment solution within the turbulent zone to create an admixture of treated gas and spent liquid treatment solution;

discharging the admixture from the bottom of the first column directly into the bottom of the second column, where the admixture enters into a settling section;

separating the treated gas from the admixture and discharging the treated gas from a top portion of the second column; and removing the spent liquid treatment solution from the settling section.

2. The process of claim 1, wherein the liquid treatment solution is injected into the first column through two or more jet nozzles.

3. The process of claim 1 further comprising, introducing the removed spent liquid treatment solution into an oxidizer;

contacting the spent liquid treatment solution with an oxygen containing gas within the oxidizer to form a regenerated treatment solution comprising elemental sulfur; and removing excess oxygen containing gas from the oxidation vessel and separately removing the regenerated liquid treatment solution from the oxidizer.

4. The process of claim 3 further comprising, recycling a portion of the removed regenerated liquid treatment solution for introduction into the jet nozzle.

5. A process to treat hydrogen sulfide present in a gas stream comprising:

directing the gas stream containing hydrogen sulfide a hydrocarbon into an absorber and separator combination comprising two vertical parallel columns, where the first column is in fluid communication with the second column such that a bottom of the first column is connected to a bottom portion of the second column, where the gas stream is introduced into a top section of an absorber column to cause the gas stream to flow downward within the absorber column;

injecting a first stream of liquid treatment solution comprising a chelated metal catalyst into the gas stream through a first jet nozzle positioned within the first column at a position below the top section of the first column, where the first jet nozzle is oriented to cause the liquid treatment solution to be initially directed upward into the downward flowing gas stream to create a first turbulent mixing zone above the first jet nozzle;

maintaining the flow rate of the gas stream within the first column such that the initial upward flow of the liquid treatment solution is reversed to a downward directed flow;

absorbing the hydrogen sulfide into the liquid treatment solution within the turbulent zone to create an admixture of treated gas and spent liquid treatment solution;

discharging the admixture from the bottom of the first column and directly into a bottom section of the second column;

separating the treated gas comprising the hydrocarbon from the admixture and discharging the treated gas from a top section of the second column; and removing the spent liquid treatment solution from the bottom section of the second column.

6. The process of claim 5 further comprising, introducing the removed spent liquid treatment solution to a top section of an oxidizer;

contacting the spent liquid treatment solution with an oxygen containing gas within the oxidizer to form a regenerated treatment solution comprising elemental sulfur; and removing excess oxygen containing gas from the oxidation vessel and separately removing the regenerated liquid treatment solution from the oxidizer.

7. The process of claim 6 further comprising, recycling the removed regenerated liquid treatment solution for introduction into the jet nozzle.

8. The process of claim 5 further comprising, injecting a second liquid treatment solution comprising a chelated metal catalyst into the first column through a second jet nozzle positioned within the first column at a position below the first jet nozzle, where the jet nozzle is oriented to cause the liquid treatment solution to be initially directed upward to create a second turbulent mixing zone above the second jet nozzle and below the first jet nozzle.

9. The process of claim 7 where a make-up catalyst stream is mixed with the regenerated liquid treatment solution to form part of the liquid treatment solution injected into the first jet nozzle.

10. The process of claim 6 where a portion of the regenerated liquid treatment solution is introduced into sulfur recovery process where elemental sulfur is recovered as a byproduct and a substantially sulfur free liquid treatment solution is recovered for recirculation as part of the liquid treatment solution injected into the first jet nozzle.

11. The process of claim 5 where the treated gas is passed through a mist eliminator before discharging the treated gas from the top section of the second column.

12. The process of claim 5 where flow rates of the stream of process gas and of the liquid treatment solution within the first column are controlled to be below flooding velocity.

13. The process of claim 5 where flow rates of the stream of process gas and of the liquid treatment solution within the first column are controlled to be about 25% of flooding velocity.

* * * * *